US012666343B2

(12) United States Patent
Kang et al.

(10) Patent No.: US 12,666,343 B2
(45) Date of Patent: \*Jun. 23, 2026

(54) APPARATUS AND METHOD FOR PROVIDING OPERATOR SPECIFIC SERVICE

(71) Applicant: SAMSUNG ELECTRONICS CO., LTD., Suwon-si (KR)

(72) Inventors: Sujung Kang, Suwon-si (KR); Duckey Lee, Seoul (KR); Jonghan Park, Bucheon-si (KR); Youngsun Ryu, Seongnam-si (KR); Kangjin Yoon, Seoul (KR); Hyewon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

This patent is subject to a terminal disclaimer.

(21) Appl. No.: 18/357,786

(22) Filed: Jul. 24, 2023

(65) Prior Publication Data

US 2023/0370949 A1 Nov. 16, 2023

Related U.S. Application Data

(63) Continuation of application No. 17/466,852, filed on Sep. 3, 2021, now Pat. No. 11,711,746, which is a (Continued)

(30) Foreign Application Priority Data

May 2, 2017 (KR) ........................ 10-2017-0056484

(51) Int. Cl.
*H04W 48/02* (2009.01)
*H04W 4/50* (2018.01)
(Continued)

(52) U.S. Cl.
CPC ............. *H04W 48/02* (2013.01); *H04W 4/50* (2018.02); *H04W 12/06* (2013.01); *H04W 12/37* (2021.01);
(Continued)

(58) Field of Classification Search
CPC ....... H04W 48/02; H04W 4/50; H04W 12/06; H04W 12/37; H04W 4/60; H04W 4/70;
(Continued)

(56) References Cited

U.S. PATENT DOCUMENTS

| | | | |
|---|---|---|---|
| 8,526,912 B2 | 9/2013 | Quade | |
| 10,342,024 B1 * | 7/2019 | Mehta | ................. H04W 72/566 |

(Continued)

FOREIGN PATENT DOCUMENTS

| | | |
|---|---|---|
| CN | 102572805 A | 7/2012 |
| CN | 105050071 A | 11/2015 |

(Continued)

OTHER PUBLICATIONS

International Search Report dated Jul. 31, 2018 in connection with International Patent Application No. PCT/KR2018/005028, 3 pages.
(Continued)

*Primary Examiner* — Brandon J Miller

(57) ABSTRACT

Convergence of a 5$^{th}$-Generation communication system supporting higher data rates beyond 4$^{th}$-Generation system (s) with a technology for Internet of Things (IoT) may be applied to intelligent services. Operator specific services are permitted and provided by allowing an unauthorized terminal to search for and access the such services, and includes notifying a terminal of information corresponding to "operator specific services" by allowing a base station to broadcast predetermined information, displaying information acquired by a terminal, matching information acquired by the terminal with information broadcast from a base station to arrange
(Continued)

services, requesting access and notifying a terminal performs an access for "operator specific services" upon accessing a network, providing a menu for determining whether neighboring base stations are capable of "operator specific services" to a user of a terminal, and allowing the terminal to determine whether there is the base station broadcasting the information.

18 Claims, 8 Drawing Sheets

Related U.S. Application Data continuation of application No. 17/013,475, filed on Sep. 4, 2020, now Pat. No. 11,115,900, which is a continuation of application No. 16/687,463, filed on Nov. 18, 2019, now Pat. No. 10,772,029, which is a continuation of application No. 15/969,669, filed on May 2, 2018, now Pat. No. 10,484,928.

(51) Int. Cl.

| | |
|---|---|
| *H04W 4/60* | (2018.01) |
| *H04W 4/70* | (2018.01) |
| *H04W 8/18* | (2009.01) |
| *H04W 8/20* | (2009.01) |
| *H04W 12/06* | (2021.01) |
| *H04W 12/37* | (2021.01) |
| *H04W 48/12* | (2009.01) |
| *H04W 48/18* | (2009.01) |

(52) U.S. Cl.

CPC .............. *H04W 4/60* (2018.02); *H04W 4/70* (2018.02); *H04W 8/183* (2013.01); *H04W 8/205* (2013.01); *H04W 48/12* (2013.01); *H04W 48/18* (2013.01)

(58) Field of Classification Search

CPC ..... H04W 8/183; H04W 8/205; H04W 48/12; H04W 88/18; H04W 8/18

See application file for complete search history.

(56) References Cited

U.S. PATENT DOCUMENTS

| | | | |
|---|---|---|---|
| 10,484,928 B2 | 11/2019 | Kang et al. | |
| 10,772,029 B2 | 9/2020 | Kang et al. | |
| 11,115,900 B2 | 9/2021 | Kang et al. | |
| 2006/0030315 A1 | 2/2006 | Smith et al. | |
| 2006/0270423 A1 | 11/2006 | Hellgren | |
| 2010/0142499 A1 | 6/2010 | Zhang et al. | |
| 2011/0151836 A1 | 6/2011 | Dadu et al. | |
| 2011/0300844 A1 | 12/2011 | Kim et al. | |
| 2011/0306318 A1 | 12/2011 | Rodgers et al. | |
| 2012/0083245 A1 | 4/2012 | Adjakple et al. | |
| 2012/0108207 A1 | 5/2012 | Schell et al. | |
| 2012/0202492 A1 | 8/2012 | Moisanen | |
| 2012/0231760 A1* | 9/2012 | Zhu ...................... | H04W 76/50 |
| | | | 455/404.1 |
| 2013/0010593 A1 | 1/2013 | Cha | |
| 2013/0074163 A1 | 3/2013 | Murakami et al. | |
| 2013/0157673 A1 | 6/2013 | Brusilovsky | |
| 2013/0196650 A1* | 8/2013 | Futaki ................... | H04W 24/10 |
| | | | 455/424 |
| 2013/0336176 A1 | 12/2013 | Rubin et al. | |
| 2014/0004827 A1 | 1/2014 | O'Leary | |
| 2014/0004854 A1* | 1/2014 | Veran .................... | H04W 48/18 |
| | | | 455/432.1 |
| 2014/0031012 A1 | 1/2014 | Park et al. | |
| 2014/0269525 A1 | 9/2014 | Li et al. | |
| 2014/0302812 A1 | 10/2014 | Yu | |
| 2015/0055447 A1 | 2/2015 | Jamadagni et al. | |
| 2015/0281966 A1 | 10/2015 | Griot et al. | |
| 2015/0282042 A1 | 10/2015 | Griot et al. | |
| 2015/0282060 A1 | 10/2015 | Huang-Fu et al. | |
| 2015/0312758 A1 | 10/2015 | Redford | |
| 2015/0359026 A1* | 12/2015 | Iwai ...................... | H04W 8/265 |
| | | | 370/329 |
| 2016/0014596 A1 | 1/2016 | Khan et al. | |
| 2016/0049975 A1 | 2/2016 | Uy et al. | |
| 2016/0100451 A1 | 4/2016 | Wass et al. | |
| 2016/0246611 A1 | 8/2016 | Li et al. | |
| 2017/0094512 A1 | 3/2017 | Kiss et al. | |
| 2017/0135059 A1 | 5/2017 | Taneja et al. | |
| 2017/0156051 A1 | 6/2017 | Park et al. | |
| 2017/0161721 A1 | 6/2017 | Han et al. | |
| 2018/0063841 A1 | 3/2018 | Song et al. | |
| 2018/0103370 A1 | 4/2018 | Park et al. | |
| 2018/0255451 A1 | 9/2018 | Fan et al. | |

FOREIGN PATENT DOCUMENTS

| | | |
|---|---|---|
| CN | 105916134 A | 8/2016 |
| CN | 106105147 A | 11/2016 |
| EP | 2756695 A1 | 7/2014 |
| EP | 3024261 A1 | 5/2016 |
| EP | 3337205 A1 | 6/2018 |
| JP | 5685639 B2 | 3/2015 |
| KR | 20090097023 A | 9/2009 |
| KR | 20090116787 A | 11/2009 |
| KR | 20160002321 U | 7/2016 |
| WO | 2013039900 A1 | 3/2013 |
| WO | 2013137629 A1 | 9/2013 |
| WO | 2016153303 A1 | 9/2016 |

OTHER PUBLICATIONS

Supplementary European Search Report dated Nov. 29, 2019 in connection with European Patent Application No. 18 79 4414, 13 pages.
Intellectual Property India, "Examination report under sections 12 13 of the Patents Act", issued Feb. 11, 2022, in connection with Indian Patent Application No. 201937042268, 6 pages.
China National Intellectual Property Administration (CNIPA), "The First Office Action" issued Mar. 31, 2022, in connection with Chinese Patent Application No. 201880029166.2, 18 pages.
3GPP TS 23.122 V13.6.0 (Sep. 2016) Technical Specification; 3rd Generation Partnership Project; Technical Specification Group Core Network and Terminals; Non-Access-Stratum (NAS) functions related to Mobile Station (MS) in idle mode (Release 13); 49 pages.
Office Action dated Jan. 10, 2023 in connection with Chinese Patent Application No. 201880029166.2, 13 pages.
Office Action issued Jan. 27, 2026, in connection with China Patent Application No. 202310835009.3, 26 pages.

\* cited by examiner

FIG. 5

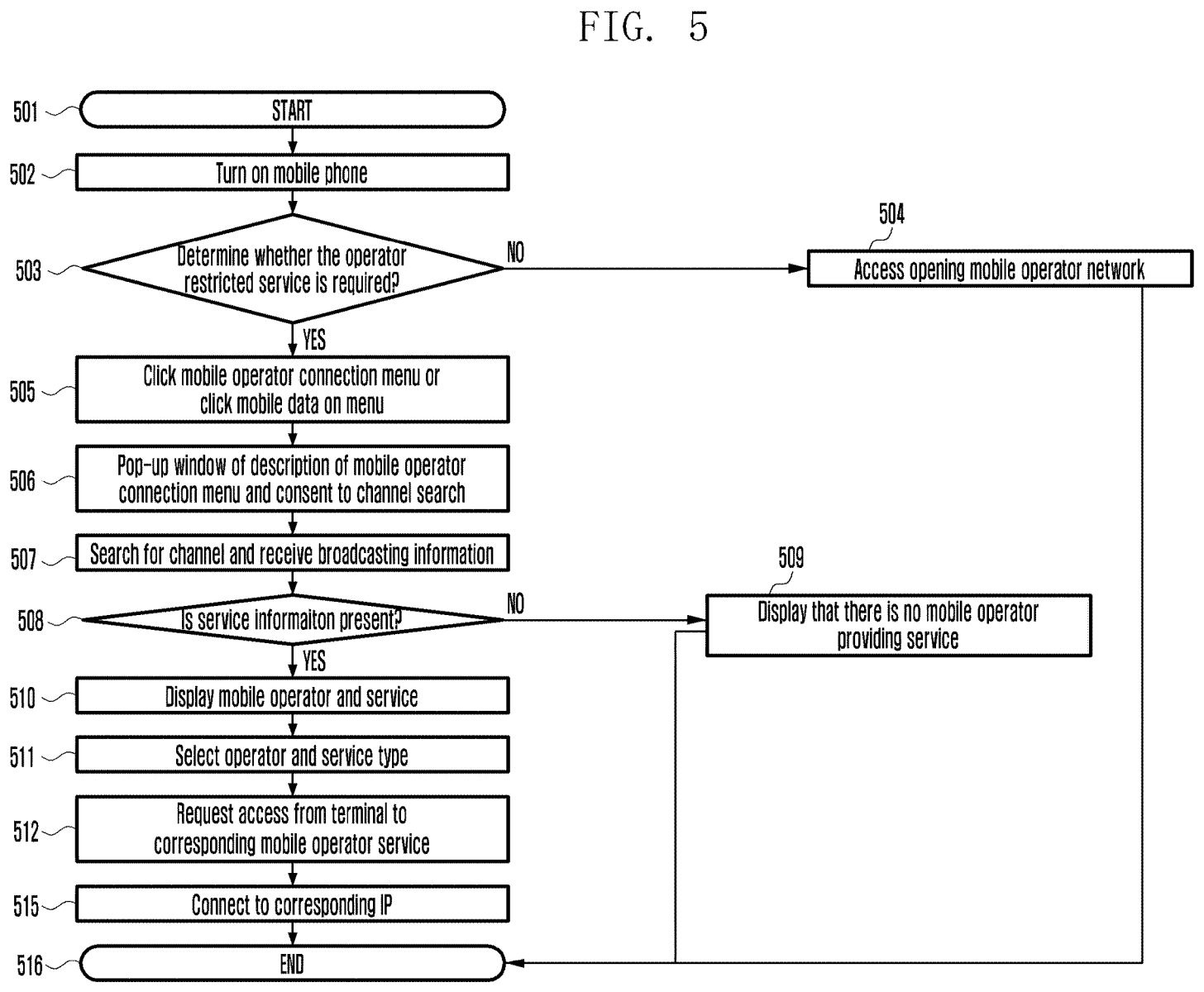

START — 501

Turn on mobile phone — 502

Determine whether the operator restricted service is required? — 503

NO → Access opening mobile operator network — 504

YES

Click mobile operator connection menu or click mobile data on menu — 505

Pop-up window of description of mobile operator connection menu and consent to channel search — 506

Search for channel and receive broadcasting information — 507

Is service information present? — 508

NO → Display that there is no mobile operator providing service — 509

YES

Display mobile operator and service — 510

Select operator and service type — 511

Request access from terminal to corresponding mobile operator service — 512

Connect to corresponding IP — 515

END — 516

FIG. 7

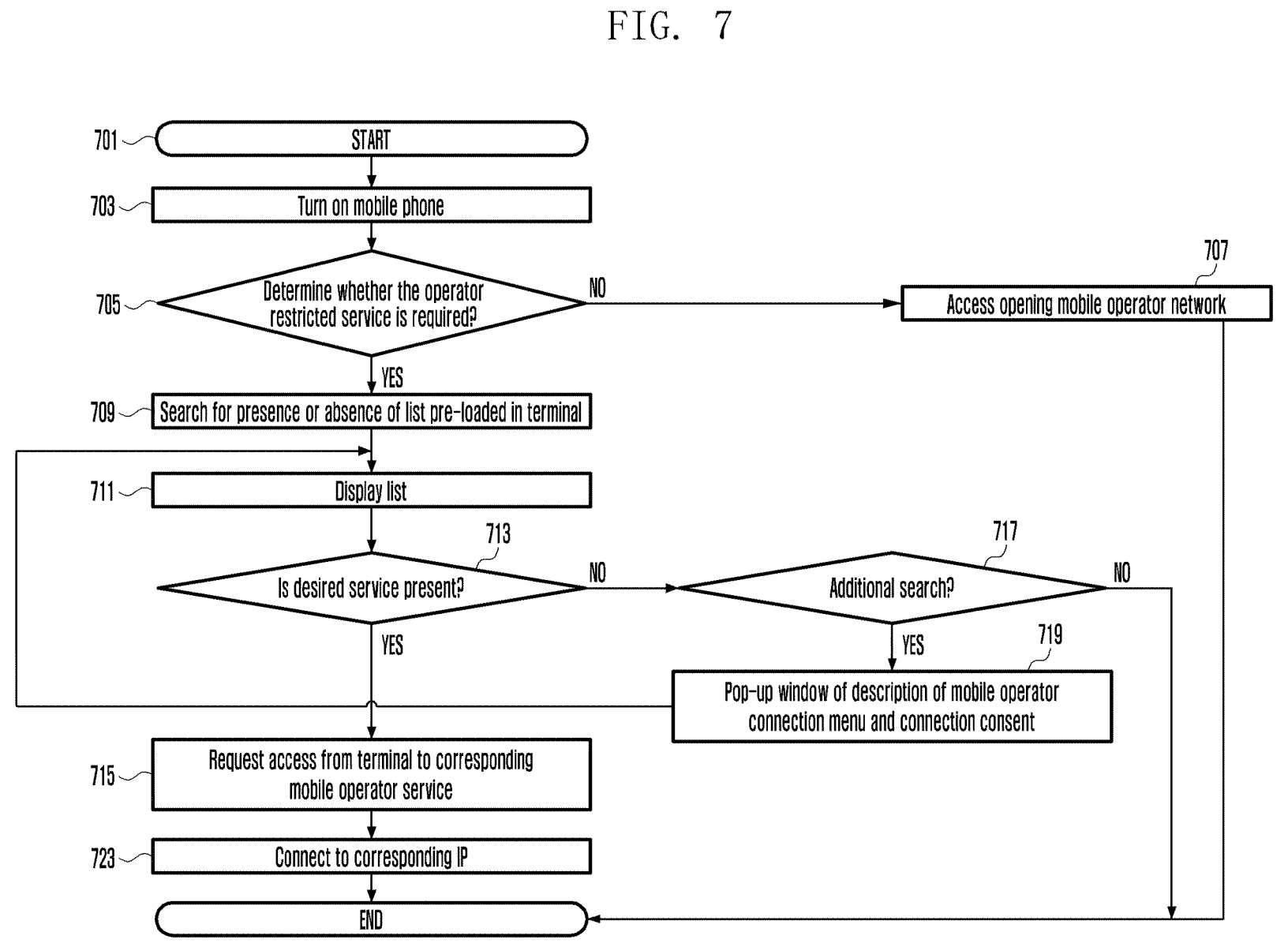

701 START

703 Turn on mobile phone

705 Determine whether the operator restricted service is required?

NO → 707 Access opening mobile operator network

YES

709 Search for presence or absence of list pre-loaded in terminal

711 Display list

713 Is desired service present?

NO → 717 Additional search?

YES → 719 Pop-up window of description of mobile operator connection menu and connection consent NO (from 717)

YES (from 713) → 715 Request access from terminal to corresponding mobile operator service 723 Connect to corresponding IP

END

FIG. 8

APPARATUS AND METHOD FOR PROVIDING OPERATOR SPECIFIC SERVICE

CROSS-REFERENCE TO RELATED APPLICATIONS

This application is a continuation of U.S. patent application Ser. No. 17/466,852 filed Sep. 3, 2021, now U.S. Pat. No. 11,711,746 issued Jul. 25, 2023, which is a continuation of U.S. patent application Ser. No. 17/013,475 filed on Sep. 4, 2020, now U.S. Pat. No. 11,115,900, issued Sep. 7, 2021, which is a continuation of U.S. patent application Ser. No. 16/687,463 filed on Nov. 18, 2019, now U.S. Pat. No. 10,772,029 issued on Sep. 8, 2020, which is a continuation of U.S. patent application Ser. No. 15/969,669 filed on May 2, 2018, now U.S. Pat. No. 10,484,928 issued on Nov. 19, 2019, which is based on and claims priority to Korean Patent Application No. 10-2017-0056484 filed on May 2, 2017 in the Korean Intellectual Property Office, the disclosures of which are incorporated herein by reference in their entirety.

TECHNICAL FIELD

Various embodiments of the present disclosure relate to a method for permitting and providing operator specific services by allowing a terminal to search for and access the operator specific services in a wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System." The 5G communication system is considered to be implemented in higher frequency ("millimeter Wave" or "mmWave") bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Point (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In a wireless communication system, a universal integrated circuit card (UICC) is a smart card inserted into a mobile communication terminal or the like. In general, the UICC includes an access control module for accessing a network of a mobile operator. Examples of the access control module may include a universal subscriber identity module (USIM), a subscriber identity module (SIM), an IP multimedia service identity module (ISIM), etc. The UICC is also called a UICC card or a USIM card or a SIM card, and is commonly called a SIM card. The UICC may store personal information on a mobile communication subscriber and perform subscriber authentication and a generation of a traffic security key upon an access to a mobile communication network, thereby implementing the use of the safe mobile communication. With the proliferation of IoT fields, an embedded UICC (eUICC) is being applied to terminals such as wearable, automobile, and a smart meter. The UICC card, which can download and select the SIM module, is collectively called a eUICC. That is, the UICC card, which is fixed or not fixed in the terminal, among the UICC cards which may download and select the SIM modules remotely, and the term "eUICC profile" is collectively called the downloaded SIM module information.

SUMMARY

When the network cannot recognize the corresponding terminal due to damage to the SIM card, the eUICC, or the eUICC profile of the terminal, or when a user wants to subscribe and open a service directly from a terminal with no contract or an eUICC applied terminal, the user needs to access the terminal in order to receive operator specific services via a customer center or a specific website. However, since the corresponding terminal is in an unauthenticated state which cannot be authenticated in the network, the access to the network cannot be made, so the corresponding terminal may not receive services via the network access and a telephone, which results in inconvenience to the user. Accordingly, embodiments of the present disclosure are directed to the provision of a method for permitting operator specific services so that a terminal can search for and access the operator specific services.

Objects of the present disclosure are not limited to the above-mentioned objects. That is, other objects that are not mentioned may be understood by those skilled in the art to which the present disclosure pertains from the following description.

Various embodiments of the present disclosure are directed to the provision of a method for operating a terminal, including: determining whether an operator restricted service is required; acquiring operator service information if the operator restricted service is required; and performing the operator restricted service if an access to an operator network selected based on the operator service information succeeds.

Various embodiments of the present disclosure are directed to the provision of a terminal, including; a transceiver configured to transmit and receive a signal; and a controller configured to perform a control to determine whether an operator restricted service is required, acquire operator service information if the operator restricted service is required, and perform the operator restricted service if an access to the operator network selected based on the operator service information succeeds.

According to embodiments of the present disclosure, it is possible to provide the method and apparatus for providing operator specific services.

In addition, according to embodiments of the present disclosure, when the subscriber information cannot be recognized due to the damage to the SIM card, the eUICC, or the eUICC profile of the terminal, the problems can be solved by allowing the terminal with the above problems to access the call center or the website of the service center of the corresponding operator.

In addition, according to embodiments of the present disclosure, when the subscriber wants to receive the opening of the terminal with no contract or the eUICC profile download services, the terminal can directly receive the opening and download service by accessing the call center or the web site of the service center.

The effects that may be achieved by the embodiments of the present disclosure are not limited to the above-mentioned objects. That is, other effects that are not mentioned may be understood by those skilled in the art to which the present disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates a diagram of an operation of a terminal according to embodiments of the present disclosure;

FIG. 7 illustrates a diagram of an operation of a terminal when the "operator specific services" information is pre-installed in the terminal according to embodiments of the present disclosure; and FIG. 8 illustrates a block configuration diagram of the terminal in the wireless communications system according to embodiments of the present disclosure.

DETAILED DESCRIPTION

Figure 1:
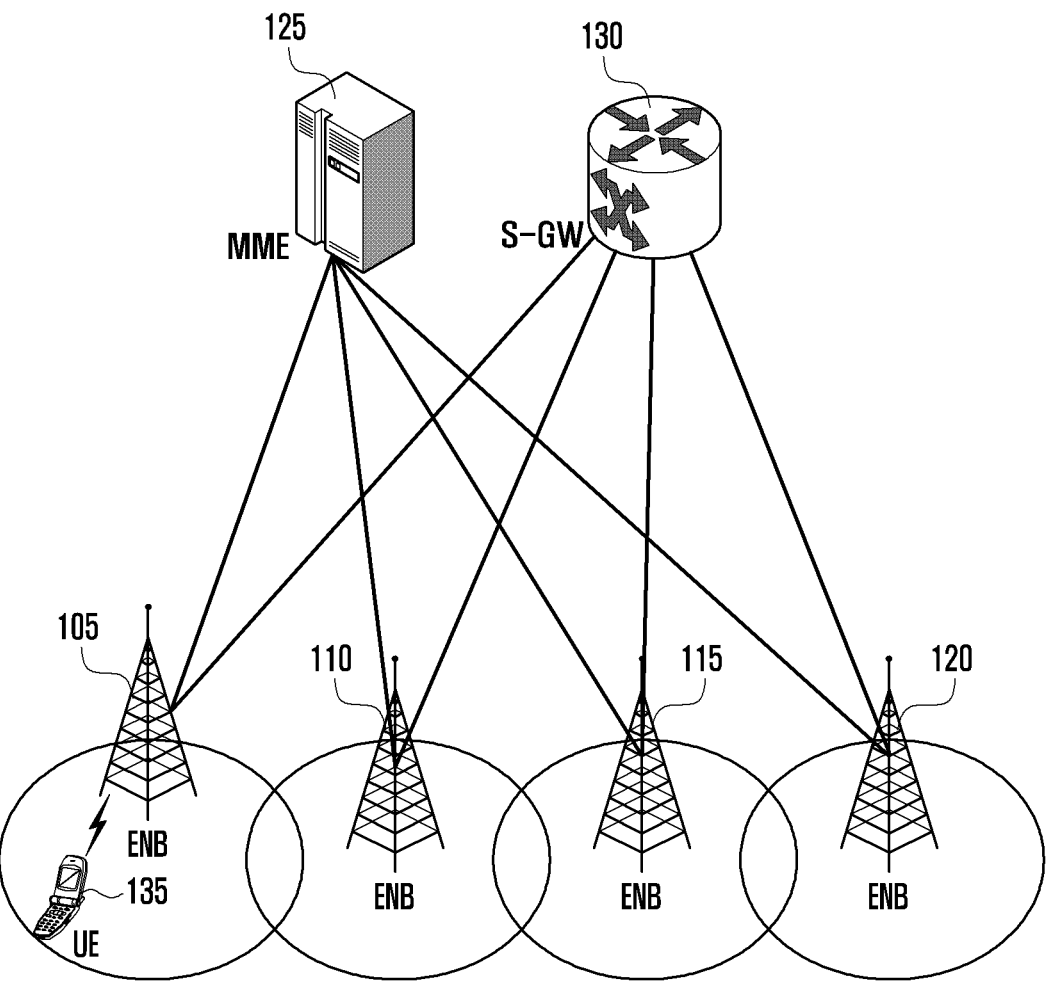
FIG. 1 illustrates a diagram of an example of a network structure of a wireless communication system according to embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an operation principle of the present disclosure will be described in detail with reference to the accompanying drawings. Hereinafter, when it is determined that the detailed description of the known art related to the present disclosure may obscure the gist of the present disclosure, the detailed description thereof will be omitted. Further, the following terminologies are defined in consideration of the functions in the present disclosure and may be construed in different ways by the intention of users and operators. Therefore, the definitions thereof should be construed based on the contents throughout the specification.

A term used to identify a connection node, a term indicating network entities, a term indicating messages, a term indicating an interface between the network entities, a term indicating various identification information, etc., that are used in the following description are illustrated for convenience of explanation. Accordingly, the present disclosure is not limited to terms to be described below and other terms indicating objects having the equivalent technical meaning may be used.

Hereafter, for convenience of explanation, the present disclosure uses terms and names defined in the 3rd generation partnership project long term evolution (3GPP LTE) standard. However, the present disclosure is not limited to the terms and names but may also be identically applied to the systems according to other standards.

As described above, a universal integrated circuit card (UICC) is a smart card inserted into a mobile communication terminal, etc., and is called a UICC card. The UICC may include an access control module for accessing a network of a mobile operator. An example of the access control module may include a universal subscriber identity module (USIM), a subscriber identity module (SIM), an IP multimedia service identity module (ISIM), etc. The UICC including the USIM is generally called an USIM card. Similarly, the UICC including a SIM module is generally a SIM card. In the following description of the present disclosure, the SIM card is used as a general meaning including the UICC, etc., in which the UICC card, the USIM card, and the ISIM are included. That is, the technology of the SIM card may be identically applied to the USIM card, the ISIM card, or even the general UICC card.

The SIM card may store personal information on a mobile communication subscriber and perform subscriber authentication and a generation of a traffic security key upon an access to a mobile communication network, thereby implementing the use of the safe mobile communication.

The SIM card is generally manufactured as a dedicated card for the corresponding mobile operator by a request of a specific mobile operator upon manufacturing of a card. A card in which authentication information for accessing a network, for example, universal subscriber identity module (USIM) application and international mobile subscriber identity (IMSI), a K value, an OPc value, etc., is mounted in advance is released. Therefore, the corresponding mobile operator receives the manufactured SIM card and delivers the UICC card to a subscriber. Thereafter, if necessary, technologies of over the air (OTA) or the like may be applied to perform managements of installation, modification, deletion, or the like of applications within the UICC. A subscriber inserts the UICC card into his/her own mobile communication terminal to use a network of the corresponding mobile operator and application services. In addition, when replacing a terminal, a subscriber takes out the UICC card from the terminal and inserts the UICC card into a new terminal, such that the new terminal may use authentication information, a mobile communication telephone number, a personal telephone directory, or the like, which are stored in the UICC card, as they are.

However, the SIM card is inconvenient for a mobile communication terminal user in receiving services of other mobile operators. There is inconvenience that the mobile communication terminal user needs to physically get the SIM card to receive services from mobile operators. For example, there is inconvenience that when a mobile communication terminal user travels to other countries, he and she needs to get an on-site SIM card to receive on-site mobile communication services. A roaming service may somewhat solve the foregoing inconveniences but there is a problem in that the mobile communication terminal user may not receive the roaming services due to an expensive fee and when a contract between mobile operators is not established.

Meanwhile, a significant portion of the foregoing inconveniences may be solved by downloading and installing the SIM module to and in the UICC card. That is, the SIM module of the mobile communication service required may be downloaded to the UICC card at the user's desired time. The UICC card may also download and install a plurality of SIM modules and may select and use only one of the plurality of SIM modules. The UICC card may be fixed in a terminal or may not be fixed in the terminal. In particular, a UICC, which is fixedly used in a terminal, is called an embedded UICC (eUICC). In the present disclosure, a UICC card, which is fixed or not fixed in the terminal, among UICC cards which may download and select SIM modules remotely, is collectively called a eUICC. Further, downloaded SIM module information is collectively used as the term eUICC profile.

When the SIM card and the eUICC or the eUICC profile is damaged, the terminal may not perform subscriber authentication and traffic security key generation upon accessing a mobile communication network. Therefore, the terminal may not be provided with a communication service for solving a problem because the terminal cannot access an operator network for purposes other than an emergency call. In this case, the user of the terminal needs to access a service center via a terminal connected to the Internet such as a home telephone and a PC or a telephone capable terminal. However, since it may not be assumed that the user has a PC, a home telephone, a public telephone or other access means upon the occurrence of the problem, and the number of households having the home telephone has been reduced slowly, a portable terminal with the problems may be only a terminal capable of making the telephone connection to the customer center. If all these means cannot be used, the user can solve the problem only by directly visiting agencies, but there is an inconvenience that he/she takes time to visit agencies.

In addition, in order to download the eUICC profile to the eUICC, a network for accessing a server for downloading profile is used. The eUICC profile may be downloaded when a network access for opening communication services of the corresponding operator for the first time is used or the eUICC profile is to be re-downloaded due to the damage to the eUICC profile. When a subscriber purchases the eUICC applied terminal at the time of inventing the patent and wants to directly open the terminal or tries to access the network due to the problem with the eUICC profile downloaded to the eUICC, the network cannot successfully authenticate the corresponding subscriber, thus the network access is not permitted.

The Global system for Mobile Communication Association (GSM), which is the standardization group for downloading the eUICC profile to the eUICC card as a method for solving the problem, is a method for acquiring a network for downloading an eUICC profile to an eUICC in a terminal, and proposes ProvisioningProfile (hereinafter, marked by Provisioning profile) which is profile which is the same as Wi-Fi or eUICC profile but restricts its own purpose only for providing connectivity.

However, the Wi-Fi is available only in limited areas. In particular, in some areas and countries where public Wi-Fi infrastructure is short, the terminal is hard to access the network over the Wi-Fi. In addition, the provisioning profile may be provided in such a manner that a terminal manu-facturer purchases the provisioning profile in a large amount under a contract with a mobile operator and then pre-installs the purchased provisioning profile in the terminal. However, the terminal manufacturer should bear the expense which is caused by the purchase of the corresponding profile and data. Also, if the term of the contracted profile between terminal manufacturers and mobile operators expires or a data usage amount contracted with the corresponding profile exceeds, there is a limitation in that a user cannot open communication services and access the network for down-loading the eUICC profile any more with the corresponding provisioning profile.

On the other hand, in recent years, there have been increasing cases of subscription services by purchasing terminals with no contract. The user joins services through a website or offline agencies of a desired mobile operator with a used terminal whose contract has already expired or a terminal with no contract. Major mobile operators in the United States have sold mobile phones with no contact, and in Korea, as a subsidy for a mobile phone subsidy decreases, there is a case in which a user purchases a terminal with no contract and gets a discount on selection contracts. Since the terminal with no contract does not have the SIM card or the opening information of the operator, the terminal cannot perform successful authentication in the network of the operator who wants to receive the services. Accordingly, the customer cannot access a website of the mobile communi-cation operator or cannot call the mobile communication operator for opening services. In such a case, a user needs to join a website of the corresponding service operator through the PC, apply for opening services through the PC, apply for a connection to a customer center through a telephone, or open services by visiting mobile communication companies.

Finally, there is a need for standardization for an access of unauthenticated terminals to a network in the working group of SA1 (Service and System Aspects Working Group 1—Services) of 3GPP which is in charge of the requirements for telecommunication services. According to manual roam-ing regulations of the Federal Communications Commission (FCC), which is the US telecommunications regulator, con-sumers should be able to receive services even if they want to receive telecommunication services in areas where there are no home operators and roaming partners for the home operator.

In the embodiments of the present disclosure, operator specific services may be called a mobile operator specific service, an operator restricted service, a restricted operator service, a restricted service, or the like.

In the embodiments of the present disclosure, at least one of a case in which a mode or a state in which an operator specific service (or operator restricted service) is used for a terminal does not have credential for 3GPP network con-nection authentication, a case in which there is SIM but an error in an SIM connection, a case in which there is a need to join or open communication services by accessing a terminal with no contract to a mobile operator may be provided.

In the embodiments of the present disclosure, when a terminal performs an access through operator specific ser-vices, it is possible to perform limited services supported by the corresponding operator, such as downloading the profile, receiving the credential for the network access authentica-tion, and subscription service for the mobile operator.

FIG. 1 illustrates a diagram of a structure of the LTE system according to embodiments of the present disclosure.

Referring to FIG. 1, the wireless communication system includes a plurality of base stations (BSs) 105, 110, 115 and 120, a mobility management entity (MIME) 125, and a serving-gateway (S-GW) 130. User equipment (hereinafter, UE or terminal) 135 is connected to an external network through the BSs 105, 110, 115, and 120 and the S-GW 130.

The base stations 105, 110, 115, and 120 are access nodes of the cellular network and provide a wireless access to terminals that are connected to the network. That is, in order to serve traffic of users, the base stations 105, 110, 115, and 120 collect and schedule state information such as a buffer state, an available transmission power state, and a channel state of the UEs to support a connection between the UEs and a core network (CN). The MME 120 is an apparatus for performing various control functions as well as a mobility management function for the terminal and is connected to a plurality of base stations, and the S-GW 1a130 is an apparatus for providing a data bearer. The data bearer refers to a logical (or virtual) channel on which data may be transmitted. In this case, only when the bearer on which data may be transmitted before the transmission of the data should be generated, the data can be transmitted. Further, the MME 120 and the S-GW 130 may further perform authen-tication, bearer management, etc., on the UE connected to the network and may process packets that are to be received from the base stations 105, 110, 115, and 120 and are to be transmitted to the base stations 105, 110, 115, and 120.

Figure 2:
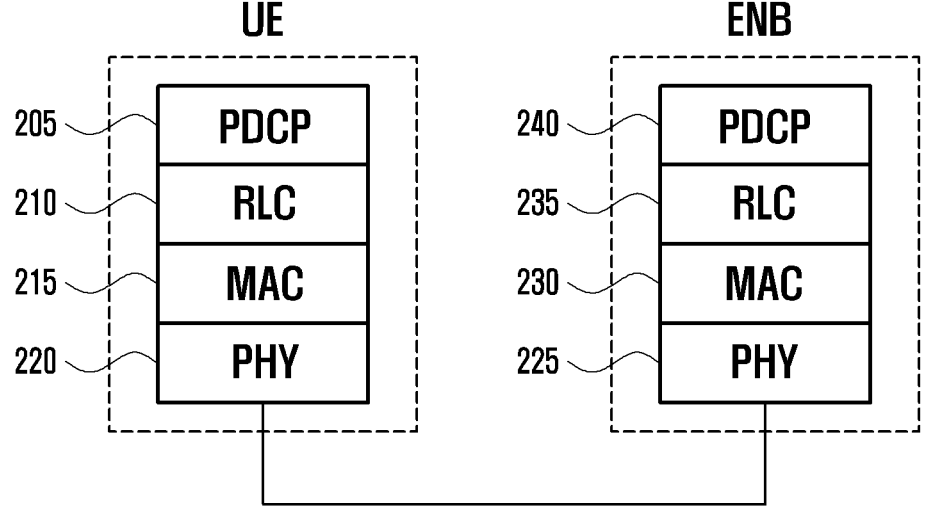
FIG. 2 illustrates a diagram of a radio protocol structure in the LTE system according to embodiments of the present disclosure.

FIG. 2 illustrates a diagram of a radio protocol structure in the LTE system according to embodiments of the present disclosure.

Referring to FIG. 2, the radio protocol of the LTE system consists of packet data convergence protocols (PDCPs) 205 and 240, radio link controls (RLCs) 210 and 235, and medium access controls (MACs) 215 and 230 in the terminal and the ENB, respectively. The packet data convergence protocols (PDCPs) 205 and 240 serve operations of serve to perform operations such as compression/recovery of an IP header and radio link controls (hereinafter, referred to as RLC) 210 and 235 reconfigures a PDCP packet data unit (PDU) at an appropriate size. The MACs 215 and 230 are connected to several RLC layer apparatuses configured in one terminal and perform an operation of multiplexing RLC PDUs in a MAC PDU and demultiplexing the RLC PDUs. Physical layers 220 and 225 perform an operation of chan-nel-coding and modulating higher layer data, making the data as an OFDM symbol, and transmitting the OFDM symbol to the radio channel or an operation of demodulating the OFDM symbol received through the radio channel, channel-decoding the OFDM symbol, and transmitting data from the OFDM symbol to a higher layer. Further, the physical layer uses an HARQ (Hybrid ARQ) for additional error correction and the receiving end transmits whether to receive the packet transmitted from the transmitting end as 1 bit. This is called HARQ ACK/NACK information. Down-link HARQ ACK/NACK information for uplink transmis-sion may be transmitted through a physical hybrid-ARQ indicator channel (PHICH) physical channel and uplink HARQ ACK/NACK information for downlink transmission may be transmitted through a physical uplink control channel (PUCCH) or physical uplink shared channel (PUSCH) physical channel.

Although not illustrated in the present drawings, radio resource control (hereinafter, referred to as RRC) layers exist at a higher part of the PDCP layer of the terminal and the base station, and the RRC layer may receive/transmit access and various configuration control messages for a radio resource control. A message of the RRC layer includes a unicast message to be transmitted to a specific terminal and a broadcast message to be broadcast to all terminals in a cell. For example, the message of the RRC layer may be used to broadcast information commonly applied to the terminals to all the terminals in the cell, or the unicast message may be transmitted to the specific terminal to instruct a specific configuration.

Examples of the broadcast message may include a system information block (SIB) for transmitting system information of a cell. Meanwhile, the LTE system provides a support for broadcasting messages in the base station using the SIB message among the RRC messages.

As described above, the technical problem of the present disclosure is to provide a method and an apparatus for a communication connection by allowing an unauthenticated terminal to select operator or communication services which the unauthenticated terminal wants to receive in a communication system. Another technical problem of the present disclosure is to provide a method and an apparatus for downloading a profile in real time to allow an unauthenticated terminal to download profile for a communication connection online in a communication system.

Particularly, the present disclosure includes the following for the above purposes.

A method for informing a terminal of information corresponding to "operator specific services" by allowing a base station to broadcast predetermined information A method for collecting and displaying information that can additionally help a user select services in a terminal, and arranging a list of operators according to specific criteria A method for requesting an access by including information informing that terminal is accessing for "operator specific services" when accessing a network A method for determining, by a terminal, whether or not there is a base station broadcasting information by providing a menu for determining whether or not there are a neighboring base stations capable of "operator specific services"

Figure 3:
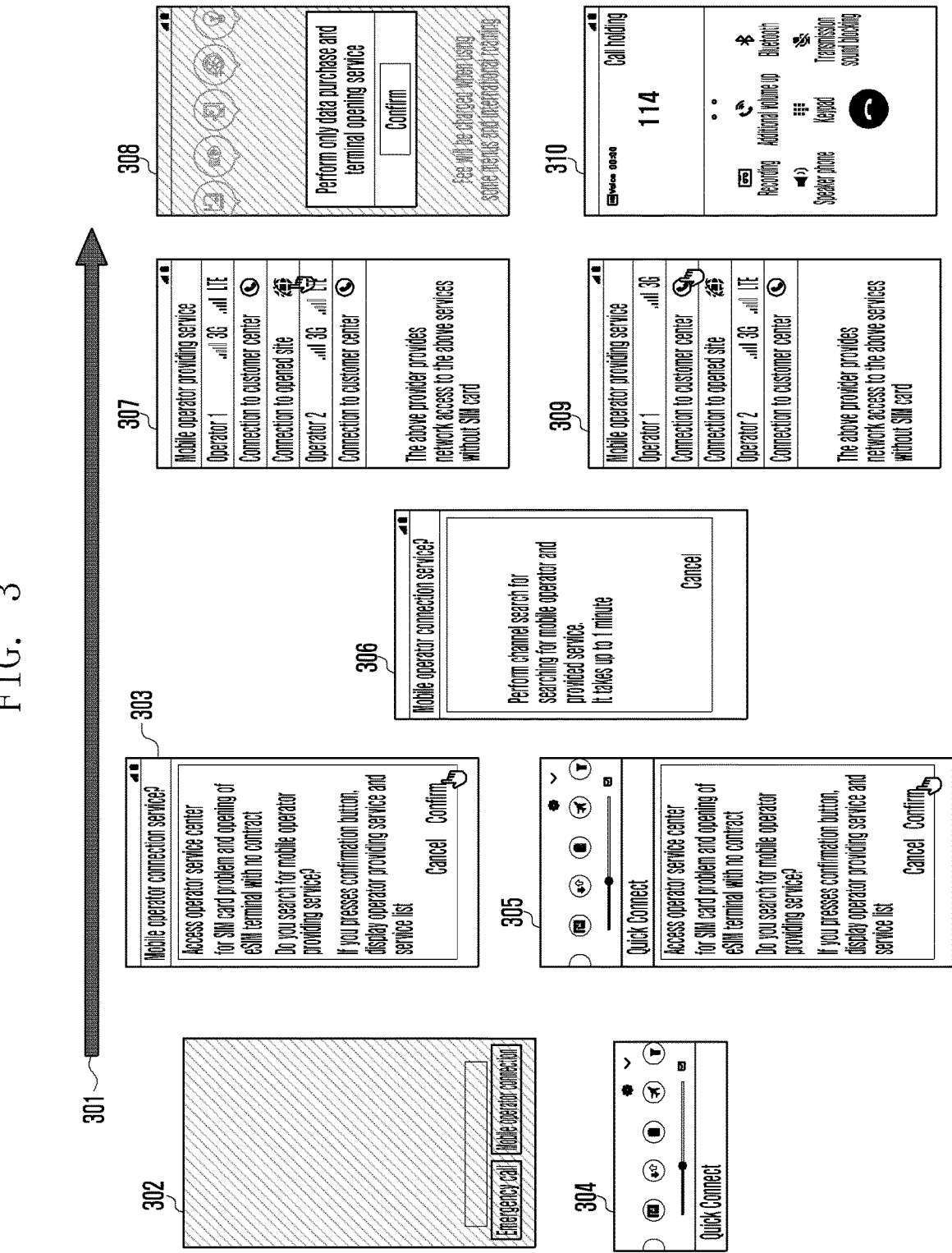
FIG. 3 illustrates a diagram of an aspect in which embodiments of the present disclosure is implemented in a terminal.

FIG. 3 illustrates a diagram of an aspect in which embodiments of the present disclosure is implemented in a terminal.

Reference numeral 301 denotes a direction in which an operation is performed in the terminal. Reference numeral 302 denotes a method for confirming operator specific services menu in a terminal. When the terminal is operated for the first time, an additional menu 304 that a user can recognize may be generated in the terminal.

When the corresponding menu is clicked, as indicated by reference numeral 303, the terminal can generate and display a message window for requesting a description of the operator specific services (mobile operator specific services) and a consent to the search of the mobile operator providing the corresponding service.

As another method, if the mobile data menu activation is clicked in a state in which when the mobile data menu is inactivated in the terminal having no SIM information, as indicated by reference numeral 305, the terminal may generate and display the message window requesting a guide for providing the operator specific services and the consent to the search of the provided mobile operator.

If the terminal receives a consent message to receive the corresponding message, as indicated by reference numeral 306, the terminal starts to search for a wireless channel, and receives information broadcast in the operator network to detect whether to provide the operator specific services and whether is the related message in the corresponding information.

Searched lists 307 and 309 are displayed on the screen of the terminal, and the terminal may display predetermined information, such as network signal strength and support communication technologies, which can be acquired by the terminal, in order to help user's judgment. The corresponding information may include the signal strength per the operator network and the provided communication technologies. The terminal may combine the broadcast information with the predetermined information acquired by the terminal to change an arrangement order of service lists and display the service lists. When a service menu (connection to opened site) including web uniform resource locator (URL) information is selected from the list displayed as indicated by reference numeral 307, like reference numeral 308, the terminal may be connected to an operator specific service portal which is connected to an internet protocol (IP) address mapped to the corresponding URL. Alternatively, as indicated by reference numeral 309, if a service menu mapped to Tel URL or session initiation protocol uniform resource identifier (SIP URI) information is selected, like reference numeral 310, a connection is made by a telephone number associated with the corresponding Tel URL or SIP URI. In states 308 or 310, the access for other data communication services is blocked, and services may be provided only to an operator specific service web portal or a telephone number.

Figure 4:
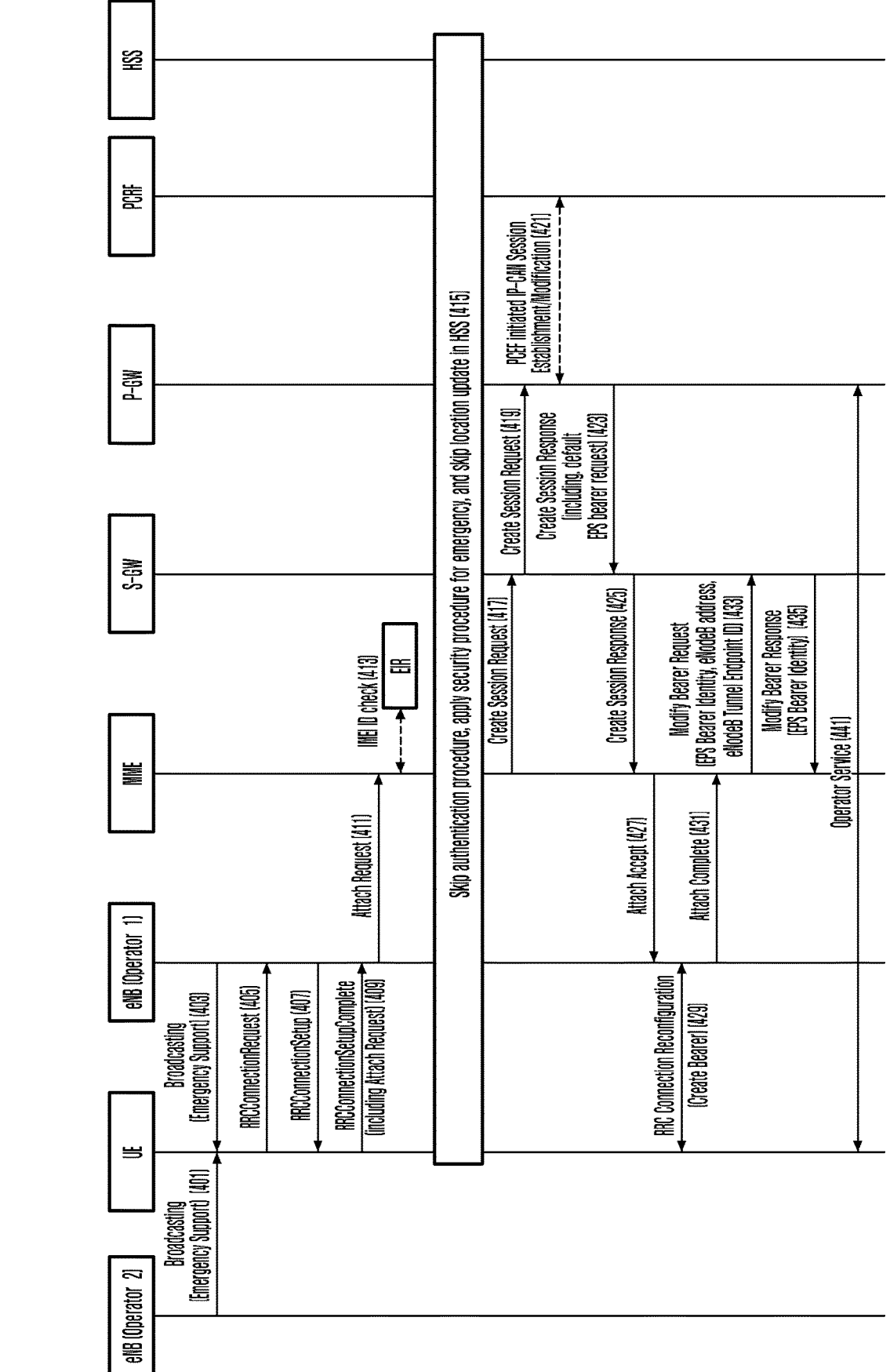
FIG. 4 illustrates a diagram of an operation of each node in the communication system according to embodiments of the present disclosure.

FIG. 4 illustrates a diagram of an operation of each node in the communication system according to the embodiments of the present disclosure.

The UE, the eNB, the mobility management entity (MME), and the serving Gateway (S-GW) shown in FIG. 4 have already been described with reference to FIG. 1. The packet data network gateway (P-GW) serves to interwork with an external network, manage data call setting, provide call charge information according to data usage, and assign an IP address. A policy and charging rule function (PCRF) is a device that performs charging and policy functions, and serves to control access by providing the charging and policy to the P-GW. A home subscriber server (HSS) serves as a subscriber database (DB) having key information and subscriber profile for each terminal.

Operations 401 and 403 are processes in which the terminal finds out whether there are specific services provided by an operator through the channel search and/or receives predetermined information on the specific services. For example, if a user's consent to the search of services displayed on the terminal as indicated by reference numerals 303 or 305 in FIG. 3, operations corresponding to operations 401 and 403 may be executed. In addition, depending on the implementation, the operations 401 and the 403 may be performed in the terminal irrespective of the user's consent.

While the corresponding operation (channel search of the terminal) is being executed, a message may be displayed on the terminal as indicated by reference numeral 306 in FIG. 3. This information may be broadcast by the SIB message described above. The information may be referred to as operator service information, operator restricted service information or the like. The service information to be broadcast may include at least one of an identifier corresponding to the operator specific services, the presence or absence of the support for the corresponding service of the operator and the essential support, the type of detailed support services, a service name or a service number, a combination of the service number and the service name, a web URL or a Tel URL mapped to the services, or a description of an SIP URI and services, but is not limited thereto. An example of a message format therefor is as follows:

```
OperatorService ::== SEQUENCE {
    operatorServiceSupport      ENUMERATED {true}  OPTIONAL,
                                                   -- Need OR
    operatorServiceName         OCTET STRNG        OPTIONAL,
                                                   -- Need OR
    operatorServiceNumber       OCTET STRNG        OPTIONAL,
                                                   -- Need OR
    operatorServiceURL          OCTET STRNG        OPTIONAL,
                                                   -- Need OR
    operatorServiceDescription  OCTET STRNG        OPTIONAL,
                                                   -- Need OR
}
```

The information (information element) may be transmitted by being additionally included in the existing SIB message such as SystemInformationBlockType1 (SIB1) and SystemInformationBlockType2 (SIB2), or a new SIB message may be defined and transmitted. In addition, for example, in a system of transmitting the SIB in an on-demand type, when the information is defined as a new SIB message and transmitted, the information on whether the new SIB message exists in the minimum SIB including minimum system information may be provided. In this case, the terminal can perform a random access or the like to the base station to request (on-demand) the SIB information to the base station, thereby receiving the new SIB to acquire the information.

The terminal performs the SIB reception operation on all frequencies supported by the terminal or the predetermined frequencies according to pre-stored information to receive the information from a base station, which is operated at the corresponding frequency, among the base stations around the terminal.

If the channel search is completed in the terminal, the name of the operator providing the corresponding service to the terminal and the information on the predetermined service may be displayed as indicated by reference numerals 307 or 309 in FIG. 3. The terminal may display the predetermined information, such as the network signal strength, the support communication technologies, which can be acquired by the terminal, in order to help the user's judgment. The corresponding information may include the signal strength per the operator network and the provided communication technologies. The terminal may combine the broadcast information with the predetermined information acquired by the terminal to change an arrangement order of service lists and display the service lists.

If a user selects operator 1, the terminal transmits a connection request message to a base station of the operator 1. The terminal may use an RRCConnectionRequest of the RRC layer to transmit the connection request message to the base station, and the RRCConnectionRequest message may include information on an establishment cause (establishmentCause). In the embodiments of the present disclosure, the terminal defines a new establishment cause to notify the base station that the access to the base station is performed for the "operator specific services" for the establishment cause.

The base station receiving the connection request message transmits a connection setup message to the terminal, and the RRConnectionSetup message of the RRC layer may be used (operation 407). The terminal receiving the same may transmit a connection setup completion message (for example, using the RRConnectionSetupComplete message of the RRC layer) to the base station, and additionally transmits the connection setup completion message including an attach request message for accessing a core network of the corresponding operator (operation 409). The attach request message is transmitted, including a UE requested PDN Connectivity Request, an Attach Type, and a Request Type. In the embodiments of the present disclosure, the terminal may configure and transmit the Attach Type and the Request Type in order to access a network for the operator specific services as follows.

Values transmitted in Attach Type and Request Type are set to be newly defined values like operator specific services (Operator Service)

Attach Type is set as the existing emergency, and Request Type are set to be newly defined values like operator specific services (Operator Service).

Request Type is set as the existing emergency, and Attach Type are set to be newly defined values like operator specific services (Operator Service).

Values transmitted in Attach Type and Attach Request are set as the existing emergency, and additionally, a new field related to the "operator specific services" is additionally set in an Attach Request message.

The MME receiving the information may figure out the access to the network for the operator specific services (operation 411), performs a procedure of confirming the identifier of the terminal to confirm whether the terminal is stolen, (operation 413), and establishes a session connection to connect to a core network (gateway) capable of providing operator specific services.

The terminal accessing to the network for the operator specific services according to the embodiments of the present disclosure tries to access the network, with the information on the international mobile equipment identity (IMEI), which is the terminal identifier, not the information embedded in the SIM information, so the authentication step in the step of performing the general network access may be omitted. The terminal performs the security procedure corresponding to the emergency call, and the message transmission to the HSS server for the location registration of the terminal may be omitted (operation 415).

In operation 417, the MME may transmit a session connection request message to the S-GW. For example, the MIME may transmit a Create session request message to the S-GW. If the S-GW receives the session connection request, the S-GW again transmits the received session connection request to the P-GW (operation 419). The P-GW applies the operator policy, which is applied to the corresponding service request such as an IP filtering rule, to the P-GW through the message exchange with the PCRF, and sets an IP address for Redirect when receiving the URL in the P-GW (Operation 421). In the P-GW, a session response message including a default EPS Bearer is transmitted to the S-GW (operation 423), and the corresponding message is finally transmitted to the MME again (operation 425). Therefore, a bearer is generated between the P-GW and the S-GW. Thereafter, the MME transmits an Attach Accept message to the base station (Operation 427). Therefore, the base station uses the RRConnectionReconfiguration message of the RRC layer to generate a radio bearer between the terminal and the base station (Operation 429). If the radio bearer setup successfully ends, the base station transmits an Attach Complete message notifying that Attach is successfully performed (operation 431), so the MME transmits a bearer change message to the S-GW to generate a bearer between the S-GW and the base station (operation 433) and receives a response message from the S-GW (operation 435). Accordingly, all bearer connection setups from the terminal to the P-GW are completed, so the terminal may receive data for the operator specific services (operation 441). The terminal may be connected to the operator specific services portal connected to the IP address mapped to the URL to receive data. Alternatively, the terminal may be connected to the corresponding Tel URL or the telephone number connected to the SIP URI to use the telephone service. In this case, the access for the data communication services other than the operator specific services are blocked, and the services may be provided only to the operator specific service web portal or the telephone number.

FIG. 5 illustrates a diagram of an operation of a terminal according to embodiments of the present disclosure.

The operation starts at block 501. After a power supply of the terminal is turned on (operation 502), in operation 503, the terminal determines whether the operator restricted service is used. The case in which the operator restricted service is used may include a case in which there is no credential for accessing the network, a case in which there is the SIM card or the SIM information but there is the error in the SIM connection, the case in which the terminal with no contract needs to join a mobile operator, and the like. Hereinafter, for convenience of explanation, the presence or absence of the SIM information will be described below by way of example. However, the following operations may be identically or similarly applied to whether there is the credential for the access authentication, whether there is error in the SIM connection, and whether to join the mobile operator of the terminal. If it is determined that there is the SIM information of the terminal (operation 503), the terminal accesses the opening mobile operator network belonging to the SIM (operation 504). On the other hand, if it is determined that there is no SIM information of the terminal (operation 503), an additional menu that the user can recognize is displayed. If the user clicks the corresponding menu or clicks mobile data on the menu (operation 505), a message window requesting the consent to the search of the mobile operator providing the description and the corresponding service may be generated and displayed (operation 506). Operations 505 and 506 can be omitted.

Thereafter, if the consent message to the reception of the corresponding message is received from the user, the terminal starts searching for a wireless channel and receives information broadcasted in the operator network (operation 507). The terminal may receive information from a plurality of base stations. The terminal detects whether to provide the operator specific services and whether there is the related message from the information (508). Accordingly, if there is no mobile operator providing services, the fact that there no mobile operator providing services is displayed, and the operation ends (509).

On the other hand, if there is a list of the searched operators, the list is displayed on the screen of the terminal (510). At this time, the predetermined information acquired to help select the services may be displayed on the terminal. The corresponding information may include the signal strength per the operator network and the provided communication technologies. The list may be displayed differently on the screen of the terminal according to the network signal strength, the communication technologies provided, or other users or terminal designation criteria. If the specific operator and service are selected from the user 511, the terminal requests an access to the corresponding operator network according to the procedure in FIG. 4 (512). If the access request is successfully completed, the terminal is connected to the corresponding IP (515). If the access request is successfully completed, when the service menu including the web URL information is selected according to the service selected by the user, the terminal is connected to the operator specific service portal connected to the IP address mapped to the corresponding URL. Alternatively, if the service menu mapped to the Tel URL or the SIP URI information is selected, the connection to the telephone number connected to the corresponding Tel URL or SIP URI is made. In this state, the access for other data communication services is blocked, and services may be provided only to the operator specific service web portal or the telephone number. The operation ends at block 516.

Figure 6:
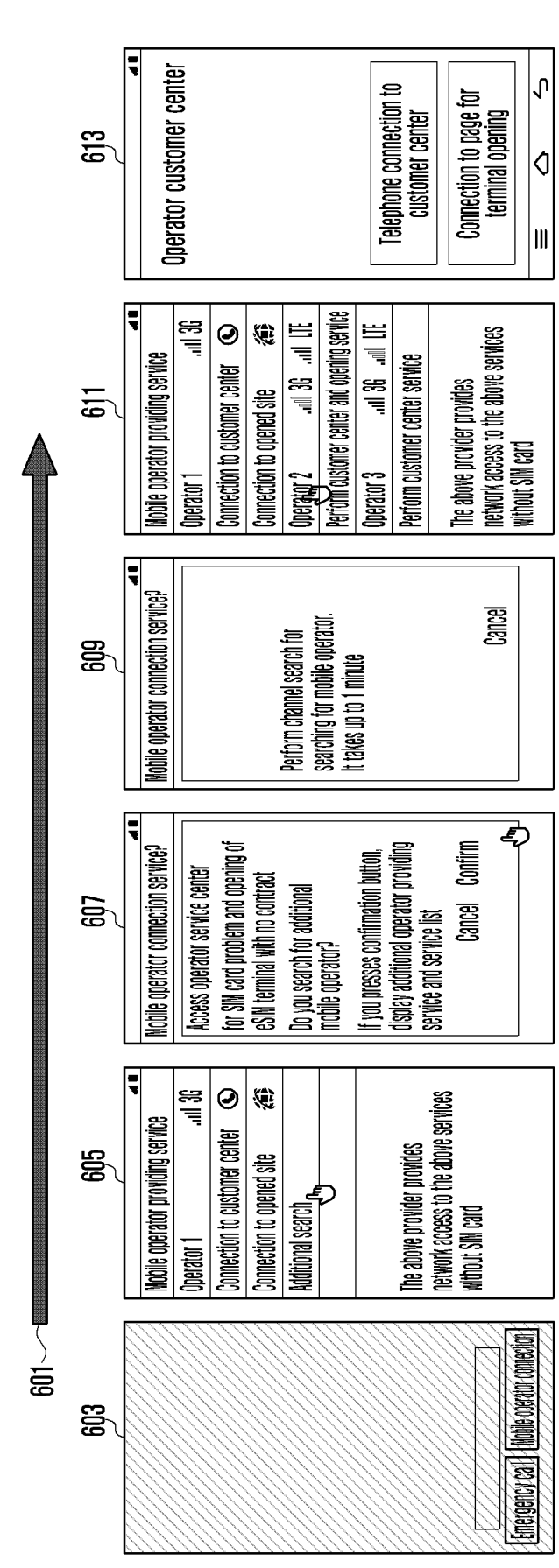
FIG. 6 illustrates a diagram of an aspect in which "operator specific services" information is pre-installed in the terminal according to embodiments of the present disclosure.

FIG. 6 illustrates a diagram of an aspect in which "operator specific services" information is pre-installed in the terminal according to embodiments of the present disclosure.

Reference numeral 601 denotes a direction in which an operation is performed in the terminal. Reference numeral 603 denotes a method for confirming operator specific services menu in a terminal. When the terminal is operated for the first time, for example, a "mobile operator connection" button which is an additional menu that a user can recognize may be generated in the terminal. When there is an "operator specific services" pre-stored in the terminal when the corresponding button is clicked, the terminal displays the corresponding list on the screen (operator 1 in 605). If there is a desired service operator and service in the corresponding list, the user selects the corresponding operator and service information. The subsequent procedure follows the procedure of the reference number 405 in FIG. 4 as described above.

If there is no desired service operator and service, the user may select the "additional search" button or the corresponding menu displayed on the terminal, as indicated by reference numeral 605. When the additional search button is clicked, the terminal may generate and display a message window requesting a description of the operator specific services and a consent to the search of a mobile operator providing the services (reference numeral 607). If the terminal receives a consent message to receive the corresponding message, as indicated by reference numeral 306, the terminal starts to search for a wireless channel, and receives information broadcast in the operator network to detect whether to provide the operator specific services and whether is the related additional message in the corresponding information (reference numeral 609). Thereafter, the terminal displays the detected service operator and service list (reference numerals 611 and 613) on the screen, and the subsequent operation follows procedures after reference numeral 605 in FIG. 4 described above.

FIG. 7 illustrates a diagram of an operation of a terminal when the "operator specific services" information is pre-installed in the terminal according to embodiments of the present disclosure.

After the power supply of the terminal is turned on (operation 703), in operation 705, the terminal determines whether the operator restricted service is used. Hereinafter, for convenience of explanation, the presence or absence of the SIM information will be described below by way of example. However, the following operations may be identically or similarly applied to whether there is the credential for the network access authentication, whether there is the error in the SIM connection, and whether to join the mobile operator of the terminal. If it is determined that there is the SIM information of the terminal (operation 705), the terminal accesses the mobile communication network belonging to the SIM (operation 707). On the other hand, if it is determined that there is no SIM information of the terminal (operation 705), when there is the "operator specific services" pre-stored in the terminal (operation 709), the terminal displays the corresponding list on the screen (operation 711). The terminal displays the predetermined information to be acquired to help select the services. The corresponding information may include the signal strength per the operator network and the provided communication technologies. The list may be displayed differently on the screen of the terminal according to the network signal strength, the communication technologies provided, or other users or terminal designation criteria. If the user of the terminal selects the corresponding operator and service information since the desired user and service are present in the list (operation 713), the terminal requests an access to the operator network according to the procedure in FIG. 4 (operation 715) as described above, and if the access request is successfully completed, connection is made to the corresponding IP (operation 723). If the access request is successfully completed, when the service menu including the web URL information is selected according to the service selected by the user, the terminal is connected to the operator specific service portal connected to the IP address mapped to the corresponding URL. Alternatively, if the service menu mapped to the Tel URL or the SIP URI information is selected, the connection to the telephone number connected to the corresponding Tel URL or SIP URI is made. In this state, the access for other data communication services is blocked, and services may be provided only to the operator specific service web portal or the telephone number.

If there is no desired service operator and service (operation 713), when the user clicks the "additional search" button displayed on the terminal as shown by reference numeral 605 in FIG. 6 (operation 717), the terminal may generate and display the message window requesting the consent to the search of the mobile operator providing the description of the operator specific services and the corresponding services (operation 719). If the terminal receives a consent message to receive the corresponding message, as indicated by reference numeral 306, as described with reference to FIG. 4, the terminal starts to search for a wireless channel, and receives information broadcast in the operator network to detect whether to provide the operator specific services and whether is the related additional message in the corresponding information, and the terminal displays the corresponding list on the screen (operation 711). In this case, the terminal displays the predetermined information to be acquired to help select the services. The corresponding information may include the signal strength per the operator network and the provided communication technologies. The list may be displayed differently on the screen of the terminal according to the network signal strength, the communication technologies provided, or other users or terminal designation criteria. If the user of the terminal selects the corresponding operator and service information since the desired user and service are present in the list (operation 713), the terminal requests an access to the operator network according to the procedure in FIG. 4

(operation 715) as described above, and if the access request is successfully completed, connection is made to the corresponding IP (operation 723). If the access request is successfully completed, when the service menu including the web URL information is selected according to the service selected by the user, the terminal is connected to the operator specific service portal connected to the IP address mapped to the corresponding URL. Alternatively, if the service menu mapped to the Tel URL or the SIP URI information is selected, the connection to the telephone number connected to the corresponding Tel URL or SIP URI is made. In this state, the access for other data communication services is blocked, and services may be provided only to the operator specific service web portal or the telephone number.

Figure 8:
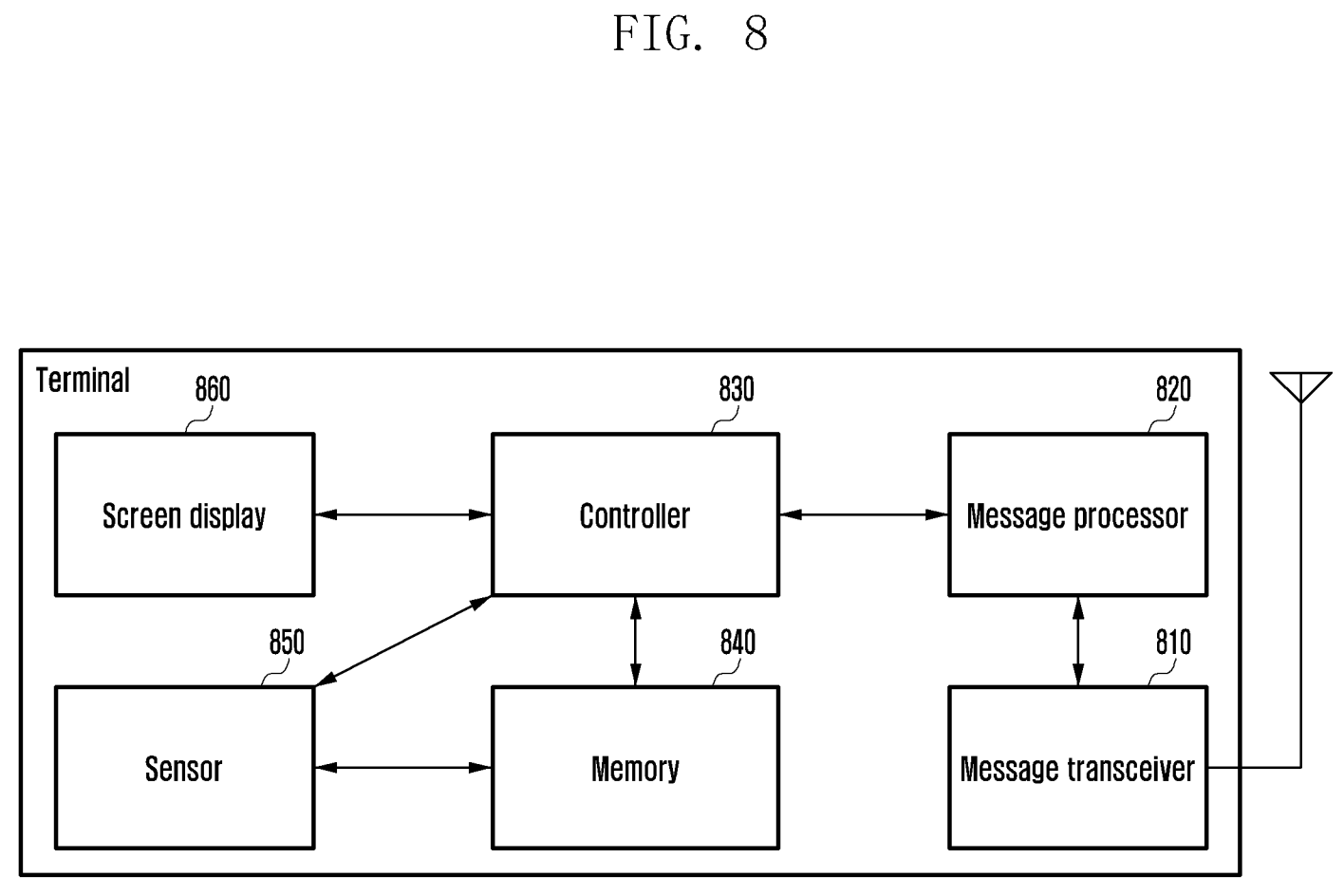

FIG. 8 illustrates a block configuration diagram of the terminal in the wireless communications system according to embodiments of the present disclosure.

Referring to FIG. 8, the terminal includes a transceiver 810, a message processor 820, a controller 830, a memory 840, and a screen display 860. At least one of the above components may be omitted. When the terminal is simply configured, the terminal may be configured to include the transceiver 810 and the controller 830.

The message transceiver 810 serves to transmit/receive a signal through a radio channel, such as band conversion and amplification of a signal. That is, the message transceiver 810 includes an RF processor for up-converting a baseband signal into an RF band signal, transmitting the up-converted signal through an antenna, and down-converting the RF band signal received through the antenna into the baseband signal, and may include a transmit filter, a receive filter, an amplifier, a mixer, an oscillator, a digital to analog converter (DAC), an analog to digital converter (ADC), or the like. FIG. 8 illustrates only one antenna but the terminal may include a plurality of antennas. Further, the message transceiver 810 may include the plurality of RF chains. Further, the message transceiver may perform beamforming. For the beamforming, the message transceiver may adjust a phase and a size of each of the signals transmitted/received through a plurality of antennas or antenna elements. The baseband processor in the message transceiver 810 performs a conversion function between the baseband signal and a bit string according to a physical layer standard of the system. For example, when data are transmitted, the baseband processor generates complex symbols by coding and modulating a transmitting bit string. Further, when data are received, the baseband processor recovers the receiving bit string by demodulating and decoding the baseband signal provided from the RF processor. For example, according to the orthogonal frequency division multiplexing (OFDM) scheme, when data are transmitted, the baseband processor generates the complex symbols by coding and modulating the transmitting bit string, maps the complex symbols to sub-operators, and then performs an inverse fast Fourier transform (IFFT) operation and a cyclic prefix (CP) insertion to configure the OFDM symbols. Further, when data are received, the baseband processor divides the baseband signal provided from the RF processor in an OFDM symbol unit and recovers the signals mapped to the sub-operators by a fast Fourier transform (FFT) operation and then recovers the receiving bit string by the modulation and decoding. The message transceiver 810 may be defined as a transceiver.

The message processor 820 performs an operation of determining whether the data transmitted or received through the message transceiver 810 is any message. For example, the message processor may determine whether the received message is the control message of the RRC layer (including the SIB) or the data message of the user. The message processor may be included in the controller 830.

The controller 830 controls the general operations of the terminal. For example, the controller 830 transmits and receives signals through the message processor 820. Further, the controller 830 records and reads data in and from the memory 840. For this purpose, the controller 830 may include at least one processor. For example, the controller 830 may include a communication processor (CP) performing a control for communication and an application processor (AP) controlling an upper layer such as the application programs. According to the embodiments of the present disclosure, if there is the operator specific service list pre-stored in the memory 840, the screen display 860 displays the list, and if there is no list or an if the additional search is requested from the user, neighboring cells are searched by the controller 830, the message processor 820, and the message transceiver 810, and a control may be made to perform the access to the operator network selected by the user among the searched cells. Also, according to embodiments of the present disclosure, the controller 830 may perform a process of recording data read through the memory 840, matching information collected through the sensor 850 or information on neighboring cells collected through the controller 830 and the message processor 820 to allow the terminal to infer and process the information which may be referenced to select the services.

The controller 830 may perform a control to determine whether the operator restricted service is used, acquire the operator service information if the operator restricted service is used, and perform the operator restricted service if the access to the operator network selected based on the operator service information succeeds. The controller 830 may determine that the operator restricted service is used in at least one of if there is no credential for the network access authentication in the terminal, if there is the error in the acquisition of the SIM information, or if subscription is required for a terminal without contract to the mobile operator. The operator restricted service may include at least one of the profile download, the credential download, the acquisition of the SIM information, and the mobile operator subscription service. In addition, the operator service information may include at least one of the operator specific service identification information, the operator specific service support information, the detailed service support type, the uniform resource locator information or the uniform resource identifier information (URI) corresponding to the service. Also, the operator service information may be broadcast through the system information. In addition, the operator information may be loaded from the information pre-stored in the terminal.

The controller 830 may perform a control to be connect to the operator service portal corresponding to the URL included in the operator service information or to the telephone number corresponding to the Tel URL or the SIP URI included in the operator service information. Also, the controller 830 may perform a control to transmit an attach request message, the attach request message may include the request type and the attach type, and at least one of the request type and the attach type may indicate that the terminal transmits is connected for the operator restricted service.

The controller 830 may perform a control to transmit the connection request message for the selected service provider and receive the connection response message. The connection request message may include the connection cause information indicating the connection request for the operator restricted service. In addition, the controller 830 may display the operator service information and may perform a control to select one operator based on the displayed operator service information.

The memory 840 stores data such as basic programs, application programs, and configuration information for the operation of the terminal. The memory 840 provides the stored data according to the request of the controller 830.

The sensor 850 may be configured to include sensors included in the terminal for the terminal to collect information that may be referenced to select services, and may include a GP sensor, for example. All or some of the sensors are activated to perform the above operation according to the request from the controller 830 to detect the state around the terminal and immediately provide the detected state to the controller 830 or store the detected state in the memory 840.

The screen display 860 may display information processed by the controller 830 on the display of the terminal screen or display a consent to an event that the terminal automatically performs or an event to be performed by a user through the processing of the controller 830.

The methods according to the embodiments described in claims or specification of the present disclosure may be implemented in hardware, software, or a combination of hardware and software.

When the methods are implemented in the software, a computer readable storage medium storing at least one program (software module) may be provided. At least one programs stored in the computer readable storage medium is configured to be executed by at least one processor within an electronic device. At least one program includes instructions that allow the electronic device to execute the methods according to the embodiments described in the claims or specification of the present disclosure.

Such programs (software module, software) may be stored in a non-volatile memory including a random access memory and a flash memory, a read only memory (ROM), an electrically erasable programmable ROM (EEPROM), a magnetic disc storage device, a compact disc-ROM (CD-ROM), digital versatile discs (DVDs) or other types of optical storage devices, and a magnetic cassette. Alternatively, the programs may be stored in the memory that is configured of combinations of some or all of the memories. Further, each configuration memory may also be included in plural.

Further, the program may be stored in an attachable storage device that may be accessed through communication networks such as Internet, an intranet, a local area network (LAN), a wide LAN (WLAN), and a storage area network (SAN) or a communication network configured in a combination thereof. The storage device may access an apparatus performing the embodiments of the present disclosure through an external port. Further, a separate storage device on the communication network may also access the apparatus performing the embodiments of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:

receiving, from a base station, system information including information indicating that a service associated with a provisioning is allowed; and in case that it is identified that the service associated with the provisioning is allowed based on the information;

performing a procedure for a radio resource control (RRC) connection setup, wherein first information indicating that an RRC connection is established for the service associated with the provisioning is transmitted to the base station, wherein the performing the procedure for the RRC connection setup includes transmitting, to the base station, a first RRC message for completion of the RRC connection setup including a request message associated with a core network entity; and receiving, from the base station, a second RRC message associated with an accept message which is a response to the request message associated with the core network entity, wherein the request message associated with the core network entity includes identity information of the terminal and second information indicating that an access to a network is for the service associated with the provisioning, and wherein a credential is provisioned to the terminal based on receiving the second RRC message.

2. The method of claim 1, wherein the first information indicates to the base station that the RRC connection is established for the service associated with the provisioning, and wherein the second information indicates to the core network entity that the access is for the service associated with the provisioning.

3. The method of claim 1, wherein the service associated with the provisioning is required based on one of an identification that there is no credential for network access authentication in the terminal, an identification that there is an error in an acquisition of subscriber identity module (SIM) information in the terminal, or an identification that a subscription is required for the terminal without contract to a mobile operator.

4. The method of claim 1, further comprising:

displaying at least one operator network that offers the service associated with the provisioning;

displaying one operator network in case that the one operator network is chosen based on the displayed at least one operator network; and displaying no service to a user in case that the service associated with the provisioning is required and the information is not received.

5. The method of claim 1, wherein the performing the procedure for the RRC connection setup further includes:

transmitting, to the base station, a message for an RRC connection request; and receiving, from the base station, a message for the RRC connection setup.

6. A method performed by a base station in a wireless communication system, the method comprising:

broadcasting system information including information indicating that a service associated with a provisioning is allowed;

performing a procedure for a radio resource control (RRC) connection setup, wherein first information indicating that an RRC connection is established for the service associated with the provisioning is received from a terminal, wherein the performing the procedure for the RRC connection setup includes receiving, from a terminal, a first RRC message for completion of the RRC connection setup including a request message associated with a core network entity; and transmitting, to the terminal, a second RRC message associated with an accept message which is a response to the request message associated with the core network entity, wherein the request message associated with the core network entity includes identity information of the terminal and second information indicating that an access to a network is for the service associated with the provisioning, and wherein a credential is provisioned to the terminal based on the second RRC message.

7. The method of claim 6, wherein the first information indicates to the base station that the RRC connection is established for the service associated with the provisioning, and wherein the second information indicates to the core network entity that the access is for the service associated with the provisioning.

8. The method of claim 6, wherein the service associated with the provisioning is required based on one of an identification that there is no credential for network access authentication in the terminal, an identification that there is an error in an acquisition of subscriber identity module (SIM) information in the terminal, or an identification that a subscription is required for the terminal without contract to a mobile operator.

9. The method of claim 6, wherein the performing the procedure for the RRC connection setup further includes:

receiving, from the terminal, a message for an RRC connection request; and transmitting, to the terminal, a message for the RRC connection setup.

10. A terminal in a wireless communication system, the terminal comprising:

a transceiver; and a controller coupled with the transceiver and configured to:

receive, from a base station, system information including information indicating that a service associated with a provisioning is allowed, and in case that it is identified that the service associated with the provisioning is allowed based on the information;

perform a procedure for a radio resource control (RRC) connection setup, wherein first information indicating that an RRC connection is established for the service associated with the provisioning is transmitted to the base station, wherein the procedure for the RRC connection setup includes a transmission of a first RRC message for completion of the RRC connection setup to the base station, the first RRC message including a request message associated with a core network entity, and receive, from the base station, a second RRC message including associated with an accept message which is a response to the request message associated with the core network entity, wherein the request message associated with the core network entity includes identity information of the terminal and second information indicating that an access to a network is for the service associated with the provisioning, and wherein a credential is provisioned to the terminal based on receiving the second RRC message.

11. The terminal of claim 10, wherein the first information indicates to the base station that the RRC connection is established for the service associated with the provisioning, and wherein the second information indicates to the core network entity that the access is for the service associated with the provisioning.

12. The terminal of claim 10, wherein the service associated with the provisioning is required based on one of an identification that there is no credential for network access authentication in the terminal, an identification that there is an error in an acquisition of subscriber identity module (SIM) information in the terminal, or an identification that a subscription is required for the terminal without contract to a mobile operator.

13. The terminal of claim 10, wherein the controller is further configured to:

display at least one operator network that offers the service associated with the provisioning, display one operator network in case that the one operator network is chosen based on the displayed at least one operator network, and display no service to a user in case that the service associated with the provisioning is required and the information is not received.

14. The terminal of claim 10, wherein the procedure for the RRC connection setup further includes:

a transmission of a message for an RRC connection request to the base station; and a reception of a message for RRC connection setup from the base station.

15. A base station in a wireless communication system, the base station comprising:

a transceiver; and a controller coupled with the transceiver and configured to:

broadcast system information including information indicating that a service associated with a provisioning is allowed, perform a procedure for a radio resource control (RRC) connection setup, wherein first information indicating that an RRC connection is established for the service associated with the provisioning is received from a terminal, wherein the procedure for the RRC connection setup includes a reception of a first RRC message for completion of a connection setup from the terminal, the first RRC message including a request message associated with a core network entity, and transmit, to the terminal, a second RRC message associated with an accept message which is a response to the request message associated with the core network entity, wherein the request message associated with the core network entity includes identity information of the terminal and second information indicating that an access to a network is for the service associated with the provisioning, and wherein a credential is provisioned to the terminal based on receiving the second RRC message.

16. The base station of claim 15, wherein the first information indicates to the base station that the RRC connection is established for the service associated with the provisioning, and wherein the second information indicates to the core network entity that the access is for the service associated with the provisioning.

17. The base station of claim 15, wherein the service associated with the provisioning is required based on one of an identification that there is no credential for network access authentication in the terminal, an identification that there is an error in an acquisition of subscriber identity module (SIM) information in the terminal, or an identification that a subscription is required for the terminal without contract to a mobile operator.

18. The base station of claim 15, wherein the procedure for the RRC connection setup further includes:

a reception of a message for an RRC connection request from the terminal; and a transmission of a message for RRC connection setup to the terminal.

\*  \*  \*  \*  \*